(12) United States Patent
Dawes et al.

(10) Patent No.: US 8,376,083 B1
(45) Date of Patent: Feb. 19, 2013

(54) COLLAPSIBLE MOBILE HUNTING STAND AND ASSOCIATED METHOD

(76) Inventors: Brent Dawes, Aurther City, TX (US);
Shelby Dawes, Aurther City, TX (US)

( * ) Notice: Subject to any disclaimer, the term of this patent is extended or adjusted under 35 U.S.C. 154(b) by 308 days.

(21) Appl. No.: 12/712,847

(22) Filed: Feb. 25, 2010

Related U.S. Application Data (60) Provisional application No. 61/208,557, filed on Feb. 25, 2009.

(51) Int. Cl.
*E06C 5/04* (2006.01)
(52) U.S. Cl. .................. 182/63.1; 182/127
(58) Field of Classification Search ............... 182/63.1, 182/127
See application file for complete search history.

(56) References Cited

U.S. PATENT DOCUMENTS

| | | | | |
|---|---|---|---|---|
| 3,406,784 A * | 10/1968 | Jones et al. | ...... | 182/97 |
| 4,625,831 A | 12/1986 | Rodgers, Jr. | | |
| 4,696,374 A * | 9/1987 | Hale | ...... | 182/127 |
| 4,787,477 A | 11/1988 | Dolan | | |
| 4,800,986 A * | 1/1989 | Hayes, III | ...... | 182/18 |
| 5,042,614 A | 8/1991 | Rainey | | |
| 5,297,844 A * | 3/1994 | Haustein | ...... | 296/190.04 |
| 6,460,653 B1 * | 10/2002 | Hardy et al. | ...... | 182/63.1 |
| 6,604,606 B1 * | 8/2003 | McDougal et al. | ...... | 182/127 |
| 6,637,549 B1 * | 10/2003 | Lopacki | ...... | 182/127 |
| 6,739,428 B1 * | 5/2004 | Holmes et al. | ...... | 182/127 |
| 7,320,382 B2 * | 1/2008 | Savoie et al. | ...... | 182/127 |
| 8,151,934 B2 * | 4/2012 | Kirby | ...... | 182/63.1 |
| 2002/0134620 A1 * | 9/2002 | Meyer | ...... | 182/127 |
| 2002/0139613 A1 * | 10/2002 | Hardy et al. | ...... | 182/63.1 |
| 2003/0000769 A1 * | 1/2003 | Pyle | ...... | 182/63.1 |
| 2003/0155179 A1 * | 8/2003 | McDougal et al. | ...... | 182/127 |
| 2006/0225957 A1 * | 10/2006 | Savoie et al. | ...... | 182/127 |
| 2006/0260871 A1 * | 11/2006 | Davis | ...... | 182/127 |
| 2007/0051559 A1 * | 3/2007 | Brown et al. | ...... | 182/63.1 |

* cited by examiner

*Primary Examiner* — Alvin Chin Shue
*Assistant Examiner* — Daniel Cahn (57) ABSTRACT

A collapsible hunting stand includes an observation platform preferably having a seat rotatably attached thereto. A first auxiliary support structure may be pivotally connected to the observation platform. A second auxiliary support structure may further be pivotally connected to the first auxiliary support structure and adapted to be statically affixed to the vehicle respectively. A first pair of support leg members may be pivotally mated to the observation platform and adapted to be removably attached to the vehicle respectively. A second pair of support leg members may be pivotally mated to the observation platform and removably attached to the first auxiliary support structure respectively. The first and second auxiliary support structures may be vertically aligned along a vertical axis while the first and second pairs of support leg members are obliquely offset relative to the vertical axis when the observation platform is biased to the associated raised erect position respectively.

5 Claims, 7 Drawing Sheets

COLLAPSIBLE MOBILE HUNTING STAND AND ASSOCIATED METHOD

CROSS REFERENCE TO RELATED APPLICATIONS

This application claims the benefit of U.S. Provisional Application No. 61/208,557, filed Feb. 25, 2009, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION
TECHNICAL FIELD

This invention relates to hunting stand equipment and, more particularly, to a collapsible mobile hunting stand for providing users with an apparatus that is easily and safely transported and assembled between remote locations.

PRIOR ART

Hunting stands are amongst the most essential equipment for successful hunters. Unfortunately, most smaller and lighter hunting stands either lack the stability and security that hunters demand, while the larger more structurally supportive stands are too heavy, immobile and difficult to assemble. The obvious need of hunters to travel great distances over various terrain types and obstacles to reach their ideal hunting sites required a reliable stand that could easily be transported, quickly assembled and still provide the needed level of security and comfort.

Accordingly, a need remains for an assembly in order to overcome the above-noted shortcomings. The present invention satisfies such a need by providing a collapsible mobile hunting stand that is convenient and easy to use, lightweight yet durable in design, versatile in its applications, and designed for providing a user with means to effectively hunt using a quick collapsible hunting stand that can easily and safely be transported by a vehicle and reassembled in minimal time.

BRIEF SUMMARY OF THE INVENTION

In view of the foregoing background, it is therefore an object of the present invention to provide an apparatus for being selectively stowed and deployed on a vehicle. These and other objects, features, and advantages of the invention are provided by a collapsible hunting stand.

The collapsible hunting stand may include an observation platform preferably having a seat rotatably attached thereto. A first auxiliary support structure may be pivotally connected to the observation platform. A second auxiliary support structure may further be pivotally connected to the first auxiliary support structure and adapted to be statically affixed to the vehicle respectively. A first pair of support leg members may be pivotally mated to the observation platform and adapted to be removably attached to the vehicle respectively. A second pair of support leg members may be pivotally mated to the observation platform and removably attached to the first auxiliary support structure respectively. Such an arrangement may allow the observation platform to be selectively pivoted about a first pivot axis when the observation platform is articulated between an associated raised erect position and an associated lowered stowed position. The arrangement may further allow the first auxiliary support structure to be selectively pivoted about a second pivot axis when the first auxiliary support structure is articulated between an associated raised erect position and an associated lowered stowed position. Such an arrangement may provide the unexpected and unpredictable advantage of being selectively stowed and deployed on a vehicle.

The first and second auxiliary support structures may be vertically aligned along a vertical axis when the observation platform is biased to the associated raised erect position such that the seat is aligned with a horizontal axis. The first and second pairs of support leg members are obliquely offset relative to the vertical axis when the observation platform is biased to the associated raised erect position. Such an arrangement may provide the unexpected and unpredictable advantage of having the support leg members supporting the observation platform when deployed to allow the user to comfortably stand or sit on a horizontal level to the ground.

The observation platform may include a rectangular top frame preferably having a plurality of rectilinear first guard rails orthogonally conjoined at an end-to-end pattern, wherein the top frame may be registered parallel to the horizontal axis when the observation platform is biased to the associated raised erect position. A plurality of rectilinear support bars may be statically mated to opposed corners of the top frame, such that the support bars may be registered parallel to the vertical axis when the observation platform is biased to the associated raised erect position. A rectangular bottom frame may have a plurality of rectilinear second guard rails orthogonally conjoined at an end-to-end pattern. The bottom frame may be registered parallel to the horizontal axis when the observation platform is biased to the raised erect position.

A bottom surface may be formed from a mesh screen and disposed subjacent to the top frame, wherein the mesh screen may be statically conjoined to an entire inner perimeter of the bottom frame. A plurality of rectilinear tensioning bars may be statically mated to opposed corners of the bottom frame as well as bottom ends of the support bars respectively. Such an arrangement may provide the unexpected and unpredictable advantage of having a rigid and strong, yet light weight structure to support a user on the safely observation platform. The guard rails may further ensure that the user may not accidentally fall off the observation platform while focusing on detecting game.

The first auxiliary support structure may include rectilinear first and second support beams aligned parallel to the vertical axis and rectilinear first plurality of rectilinear cross beams intercalated between the first and second support beams. The top ends of the first and second support beams may further be pivotally mated to selected corners of the opposed corners of the bottom frame. The second auxiliary support structure may include rectilinear third and fourth vertical support beams and a second plurality of rectilinear cross bars intercalated between the third and fourth support beams.

Further, a lower end of the first and second support beams may be pivotally mated to an upper end of the third and fourth support beams respectively while a lower end of the third and fourth support beams may be adapted to be statically coupled to the vehicle. Such an arrangement may provide the unexpected and unpredictable advantage of having a two-sectional arrangement for the support structure such that the support structure may be raised to a desired height necessary for the observation platform. The rectilinear cross beams may further advantageously serve as a ladder for a user to climb onto the observation platform.

The first and second pairs of support leg members may be adapted to be disconnected from the vehicle when the observation platform and the first auxiliary support structure are pivoted about the first and second pivot axes respectively. The second auxiliary support structure may remain vertically aligned with the vertical axis as the observation platform and the first auxiliary support structure are pivoted about the first and second pivot axes respectively. Such an arrangement may provide the unexpected and unpredictable advantage of easily deploying the observation platform to its raised position by rotating the structure towards the front of the vehicle about the first and second pivot axes respectively.

The first and second pair of support leg members may be disposed parallel to the vertical axis when the observation platform is articulated to the associated lowered stowed position. The first pivot axis may traverse the top ends of the first and second support beams while the second pivot axis may traverse the bottom ends of the first and second support beams respectively. A pole may further be used to assist in raising the observation platform from the stowed to its raised position. Such an arrangement may provide the unexpected and unpredictable advantage of synchronously rotating the support beams when deploying the apparatus to its raised or stowed positions in a much quick time than having to move each support structure at a time.

The invention may include a method of utilizing a collapsible hunting stand selectively stowed and deployed on a vehicle. Such a method may include the chronological steps of: providing an observation platform preferably having a seat rotatably attached thereto; providing and pivotally connecting a first auxiliary support structure to the observation platform; providing and pivotally connecting a second auxiliary support structure to the first auxiliary support structure; statically affixing the second auxiliary support structure to the vehicle; providing and pivotally mating a first pair of support leg members to the observation platform; and providing and pivotally mating a second pair of support leg members to the observation platform.

The method may further include the steps of: removably attaching the first pair of support leg members to the vehicle; removably attaching the second pair of support leg members to the first auxiliary support structure; selectively pivoting the observation platform about a first pivot axis by articulating the observation platform between an associated raised erect position and an associated lowered stowed position; and selectively pivoting the first auxiliary support structure about a second pivot axis by articulating the first auxiliary support structure between an associated raised erect position and an associated lowered stowed position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "present invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The apparatus of this invention is referred to generally in FIGS. 1-7 by the reference numeral 10 and is intended to provide a collapsible hunting stand. It should be understood that the collapsible hunting stand 10 may be selectively stowed and deployed on various type of vehicles and should not be limited to all-terrain vehicles, for example.

Referring generally to FIGS. 1-7, the collapsible hunting stand 10 may include an observation platform 20 preferably having a seat 21 rotatably attached thereto. A first auxiliary support structure 22 may be pivotally connected to the observation platform 20. A second auxiliary support structure 23 may be pivotally connected to the first auxiliary support structure 22 and statically affixed to the vehicle 11, respectively. A first pair of support leg members 24 may be pivotally mated to the observation platform 20 and removably attached to the vehicle 11, respectively. A second pair of support leg members 25 may be pivotally mated to the observation platform 20 and removably attached to the first auxiliary support structure 22, respectively. Such a structural arrangement advantageously allows the observation platform 20 to be selectively pivoted about a first pivot axis 90 when the observation platform 20 is articulated between an associated raised erect position and an associated lowered stowed position.

This structural arrangement further allows the first auxiliary support structure 22 to be selectively pivoted about a second pivot axis 91 when the first auxiliary support structure 22 is articulated between an associated raised erect position and an associated lowered stowed position. In this manner, such a structural arrangement provides the unexpected and unpredictable advantage of permitting a user to quickly and easily stow and deploy the observation platform 20 on vehicle 11.

Figure 4:
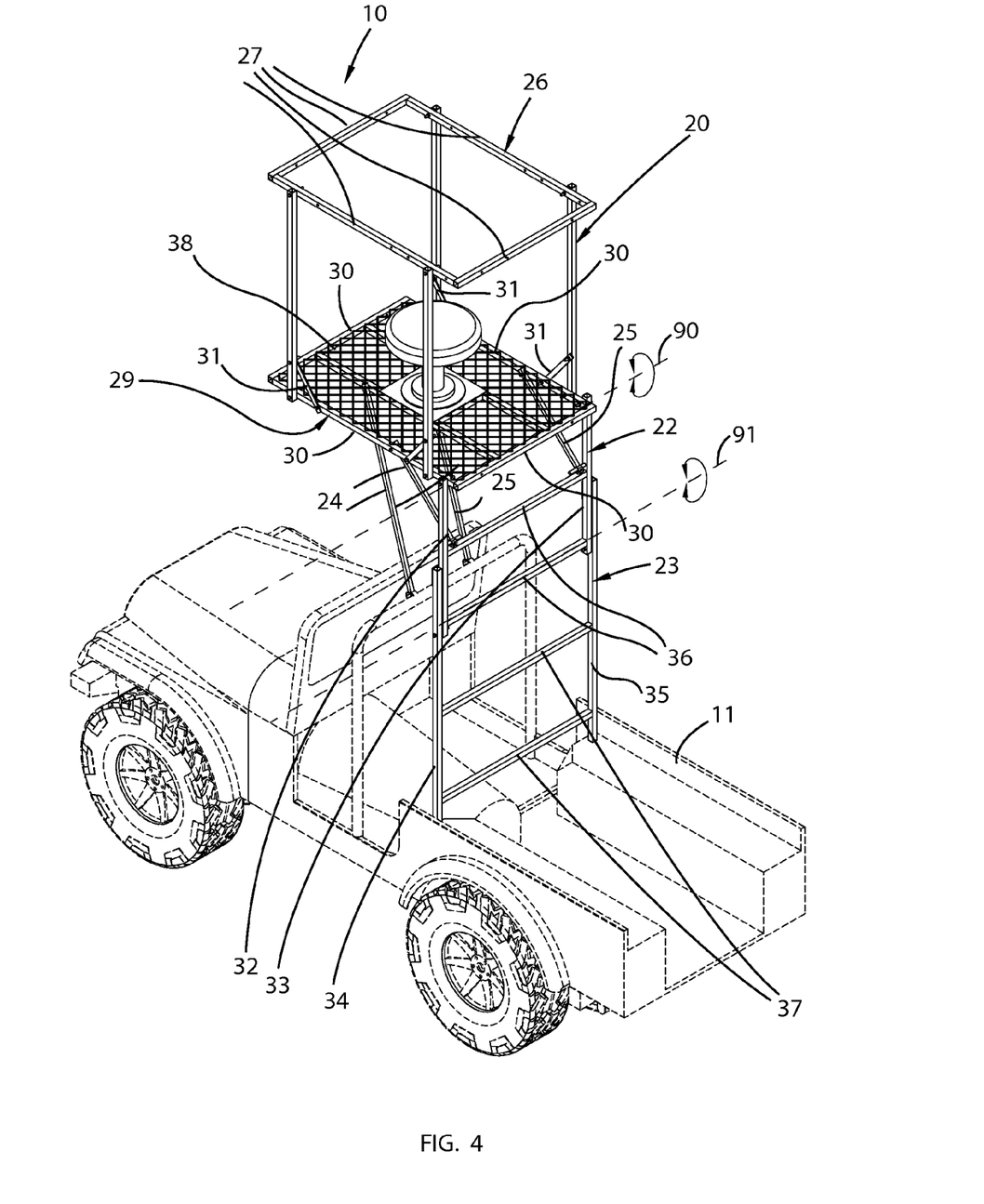
FIG. 4 is a perspective view showing the hunting disposed at the raised erect position on a vehicle.
Figure 5:
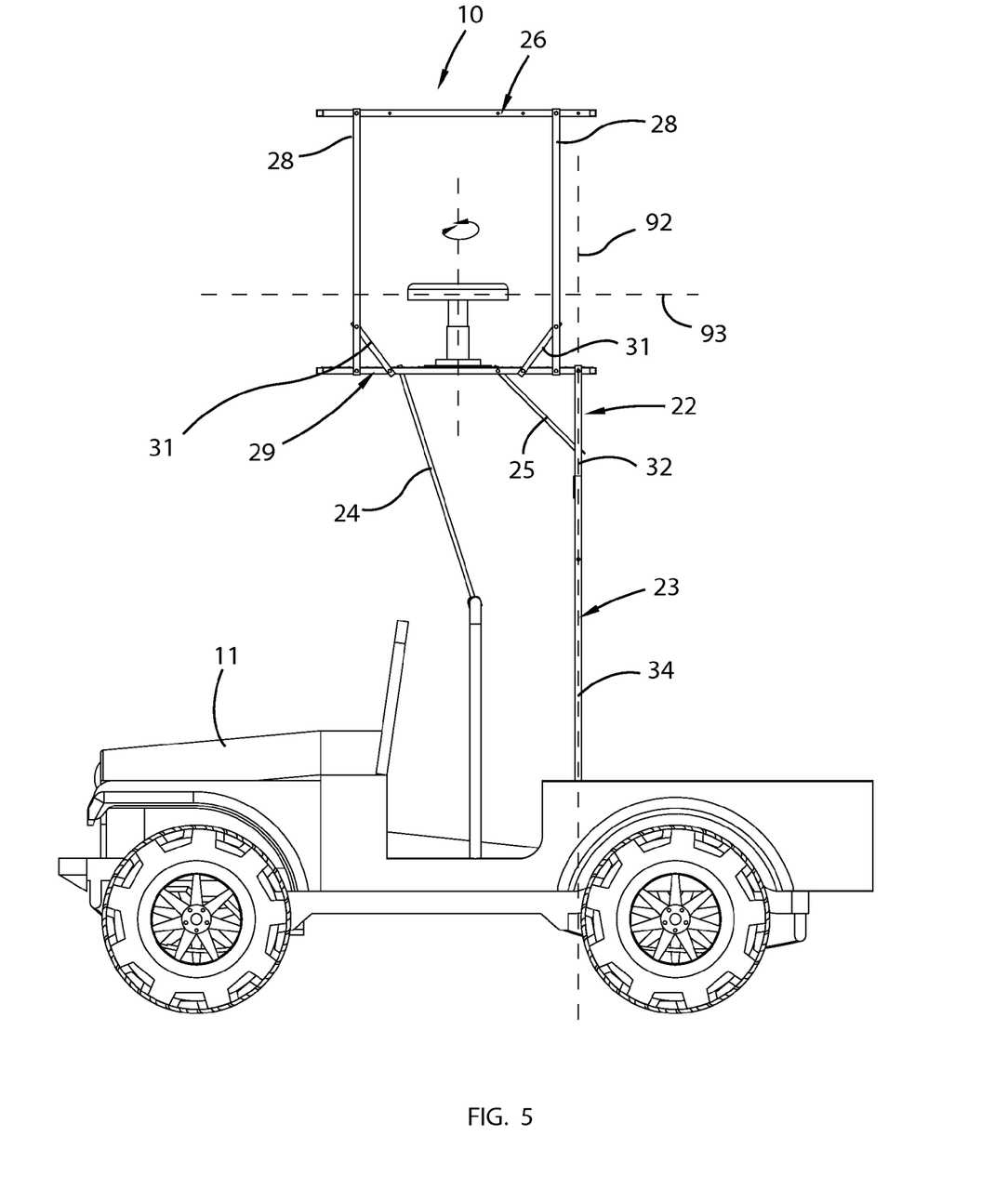
FIG. 5 is a side elevational view of the hunting stand disposed at the raised erect position relative to the horizontal and vertical axes.

Referring to FIGS. 4-7, the first and second auxiliary support structures 22, 23 may be vertically aligned along a vertical axis 92 when the observation platform 20 is biased to the associated raised erect position such that the seat 21 is aligned with a horizontal axis 93. Referring specifically to FIG. 5, the first and second pairs of support leg members 24, 25 are obliquely offset relative to the vertical axis 92 when the observation platform 20 is biased to the associated raised erect position. Such an arrangement advantageously provides the unexpected and unpredictable advantage of having the support leg members 24, 25 leveraging the observation platform 20 at the raised erect position and thereby allows the user to comfortably stand or sit on seat 21.

Referring to FIGS. 1, 2, 4, 5 and 6, the observation platform 20 may include a rectangular top frame 26 preferably having a plurality of rectilinear first guard rails 27 orthogonally conjoined at an end-to-end pattern, wherein the top frame 26 is registered parallel to the horizontal axis 93 when the observation platform 20 is biased to the associated raised erect position, as perhaps best shown in FIG. 5. A plurality of rectilinear support bars 28 may be statically mated to opposed corners of the top frame 26, such that the support bars 28 are registered parallel to the vertical axis 92 when the observation platform 20 is biased to the associated raised erect position.

A rectangular bottom frame 29 may have a plurality of rectilinear second guard rails 30 orthogonally conjoined at an end-to-end pattern. The bottom frame 29 may be registered parallel to the horizontal axis 93 when the observation platform 20 is biased to the raised erect position. A bottom surface may be formed from a mesh screen 38 and disposed subjacent to the top frame 26, wherein the mesh screen 38 is statically conjoined to an entire inner perimeter of the bottom frame 29. A plurality of rectilinear tensioning bars 31 may be statically mated to opposed corners of the bottom frame 29 as well as bottom ends of the support bars 28, respectively. Such an arrangement provides the unexpected and unpredictable advantage of having a rigid and strong, yet light weight structure to safely support a user on the observation platform 20. The guard rails 27, 30 further ensure the user will not accidentally fall off the observation platform 20 while focusing on an animal.

Figure 6:
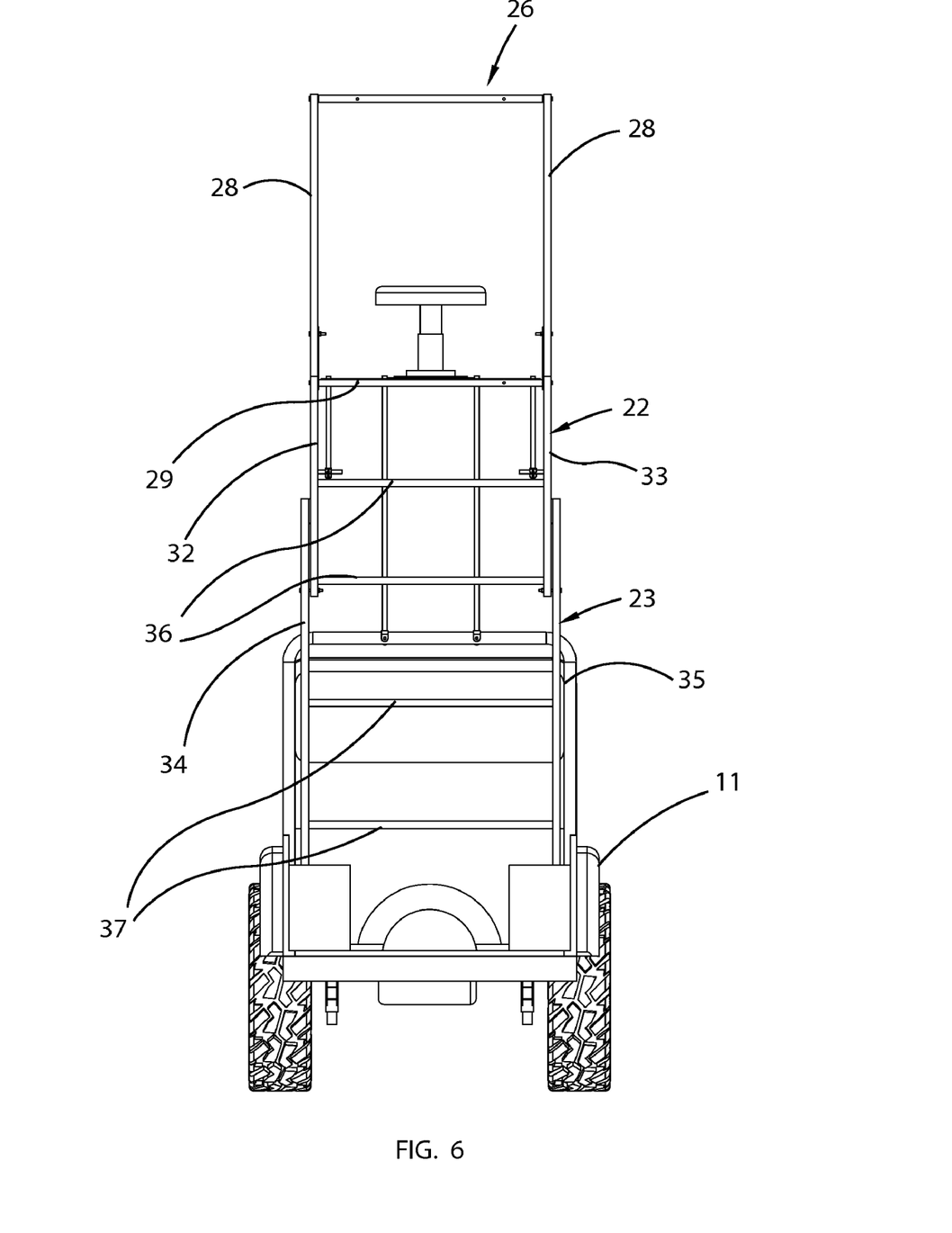
FIG. 6 is a rear elevational view of the hunting stand shown in FIG. 5.
Figure 7:
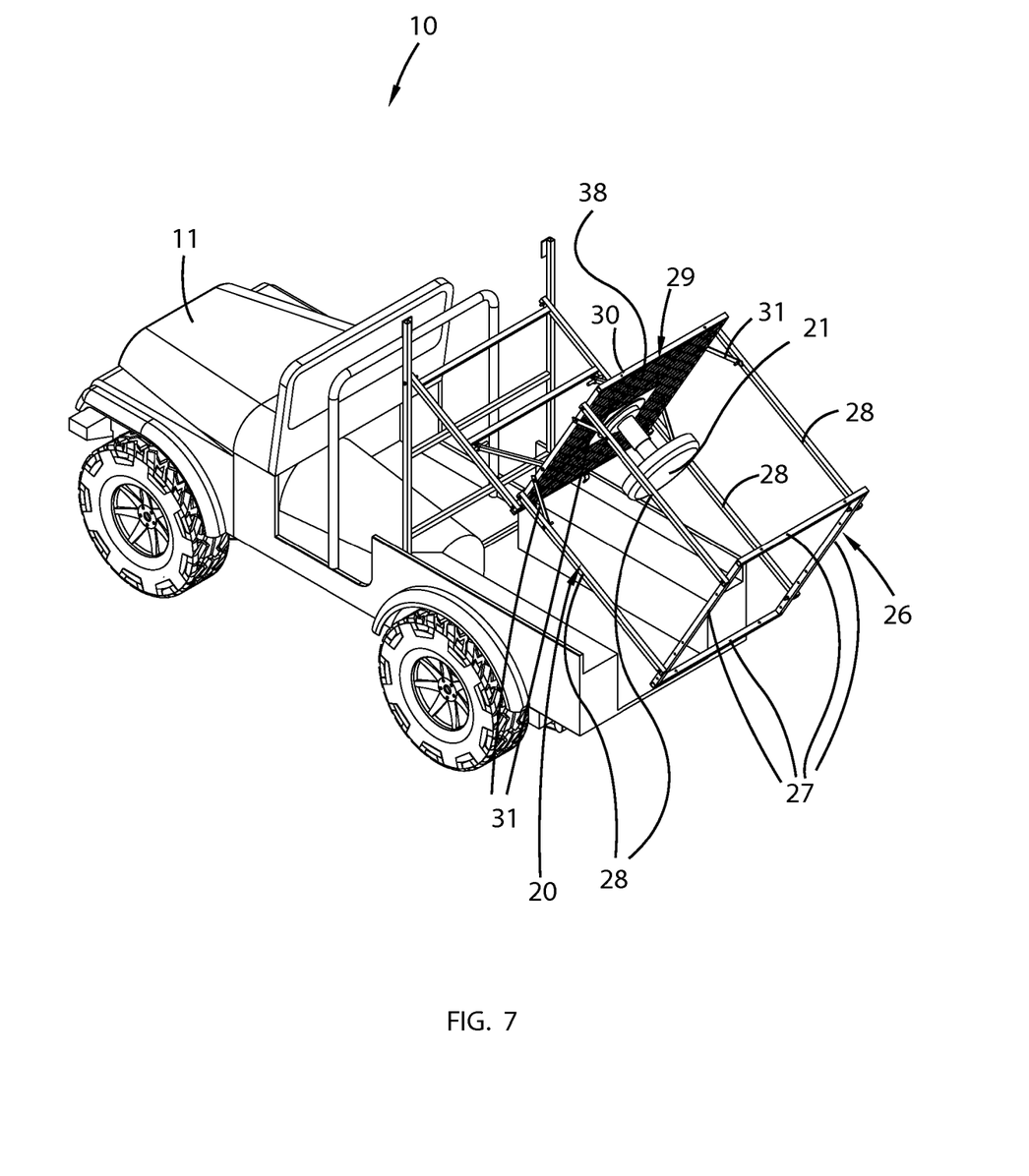
FIG. 7 is a perspective view of the hunting stand disposed at approximately 45 degrees relative to the vertical axis during articulation between the raised erect position and the lowered stowed position.

Referring to FIGS. 4-6, the first auxiliary support structure 22 may include rectilinear first and second support beams 32, 33 aligned parallel to the vertical axis 92. First rectilinear cross beams 36 are intercalated between the first and second support beams 32, 33. The top ends of the first and second support beams 32, 33 are advantageously pivotally mated to selected corners of the opposed corners of the bottom frame 29. The second auxiliary support structure 23 may include rectilinear third and fourth vertical support beams 34, 35 and a second plurality of rectilinear cross bars 37 intercalated between the third and fourth support beams 34, 35. Further, a lower end of the first and second support beams 32, 33 may be pivotally mated to an upper end of the third and fourth support beams 34, 35, respectively, while a lower end of the third and fourth support beams 34, 35 are statically coupled to the vehicle 11. Such an arrangement provides the unexpected and unpredictable advantage of having a bi-sectional support structure such that support structures 22, 23 are raised to a desired height for the observation platform 20. The rectilinear cross beams 36, 37 advantageously serve as a ladder for a user to climb onto the observation platform 20.

Referring again to FIGS. 4-6, the first and second pairs of support leg members 24, 25 may be disconnected from the vehicle 11 when the observation platform 20 and the first auxiliary support structure 22 are pivoted about the first and second pivot axes 90, 91, respectively. Advantageously, the second auxiliary support structure 23 may remain vertically aligned with the vertical axis 92 as the observation platform 20 and the first auxiliary support structure 22 are pivoted about the first and second pivot axes 90, 91, respectively. Such an arrangement provides the unexpected and unpredictable advantage of easily deploying the observation platform 20 to its raised erect position by rotating same towards a front of vehicle 11 and about first and second pivot axes 90, 91, respectively. Pole 39 may be provided to assist articulation of the observation platform 20 and first support structure 22.

Referring now to FIGS. 4 and 5, the first and second pair of support leg members 24, 25 may be disposed parallel to the vertical axis 92 when the observation platform 20 is articulated to the associated lowered stowed position. The first pivot axis 90 traverses the top ends of the first and second support beams 32, 33, while the second pivot axis 91 traverses the bottom ends of the first and second support beams 32, 33, respectively.

Figure 1:
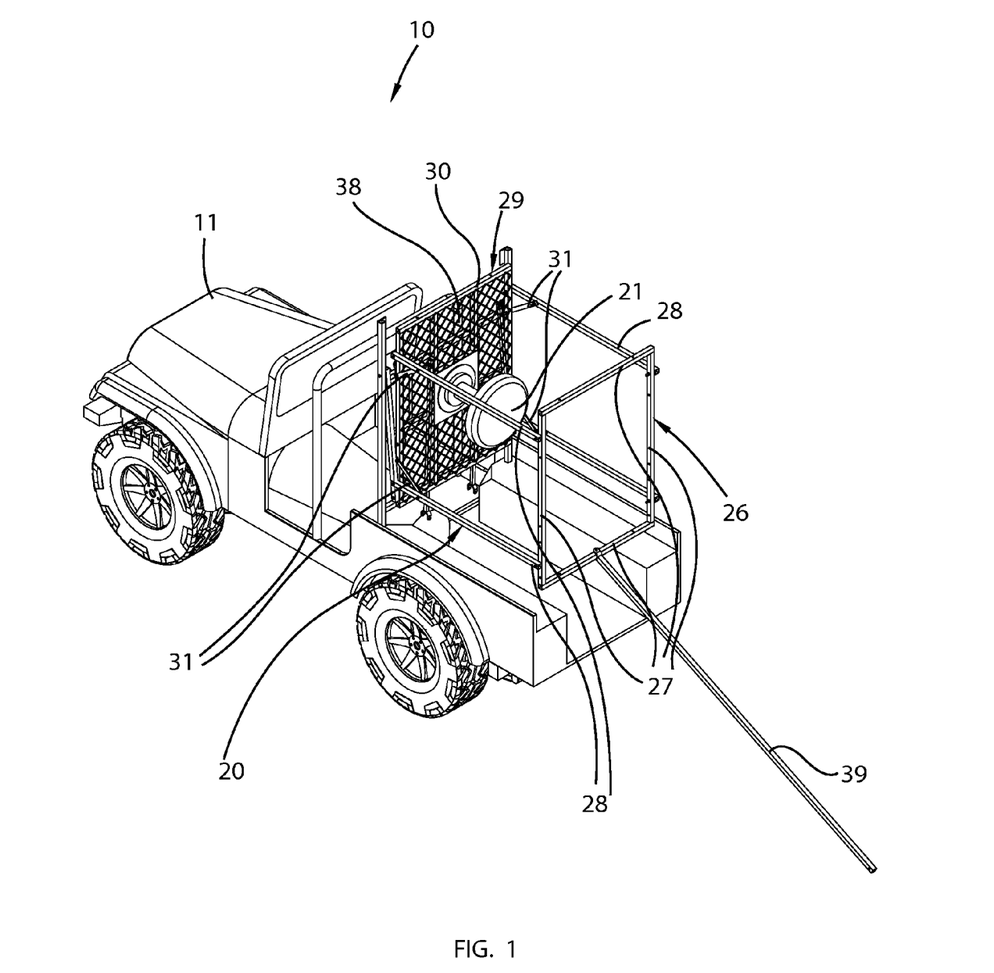
FIG. 1 is a perspective view showing a portable hunting stand mounted on a vehicle at a lowered stowed position, in accordance with the present invention.
Figure 2:
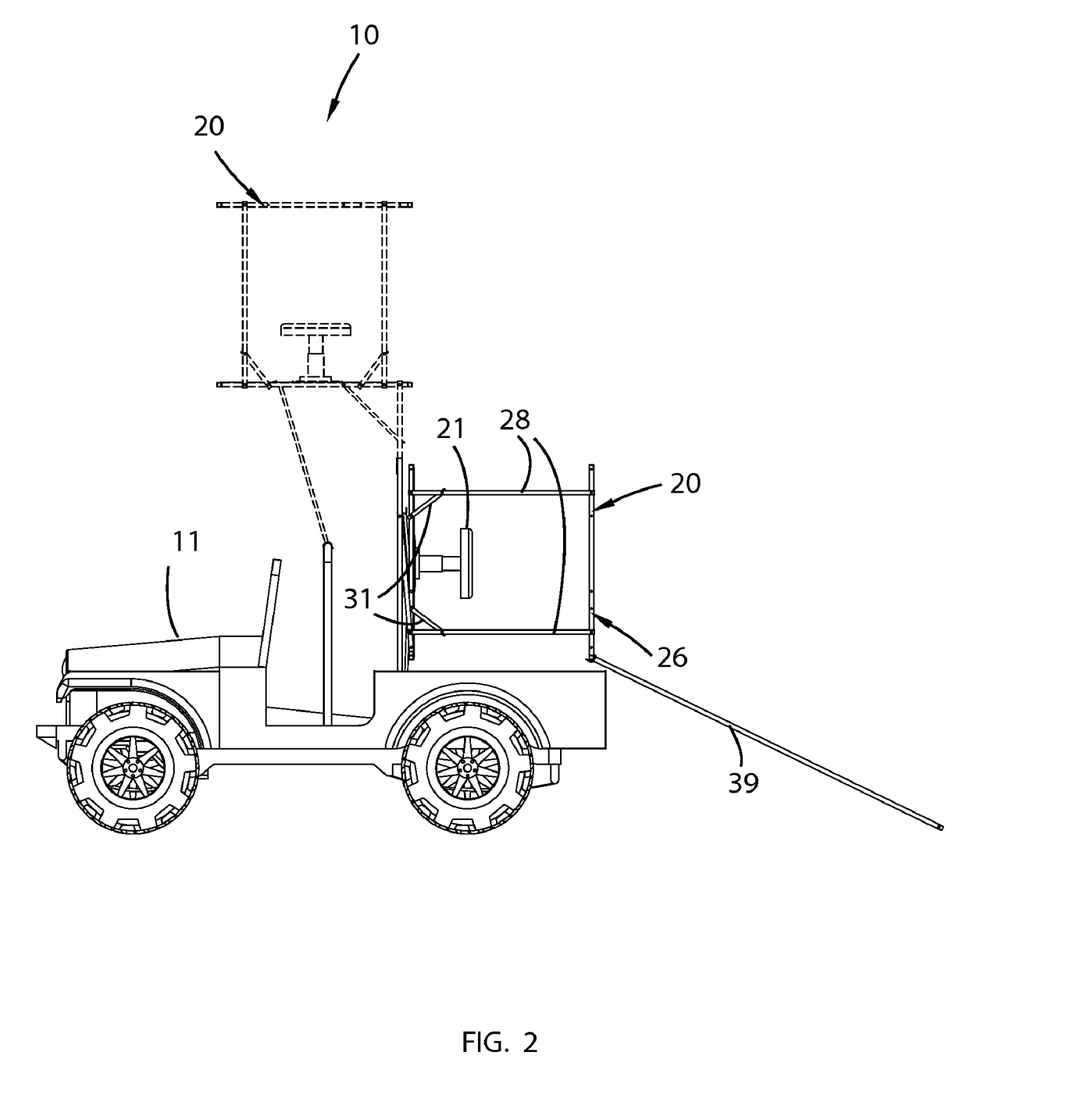
FIG. 2 is a side elevational view of the hunting stand showing the articulation between the raised erect position and the lowered stowed position.
Figure 3:
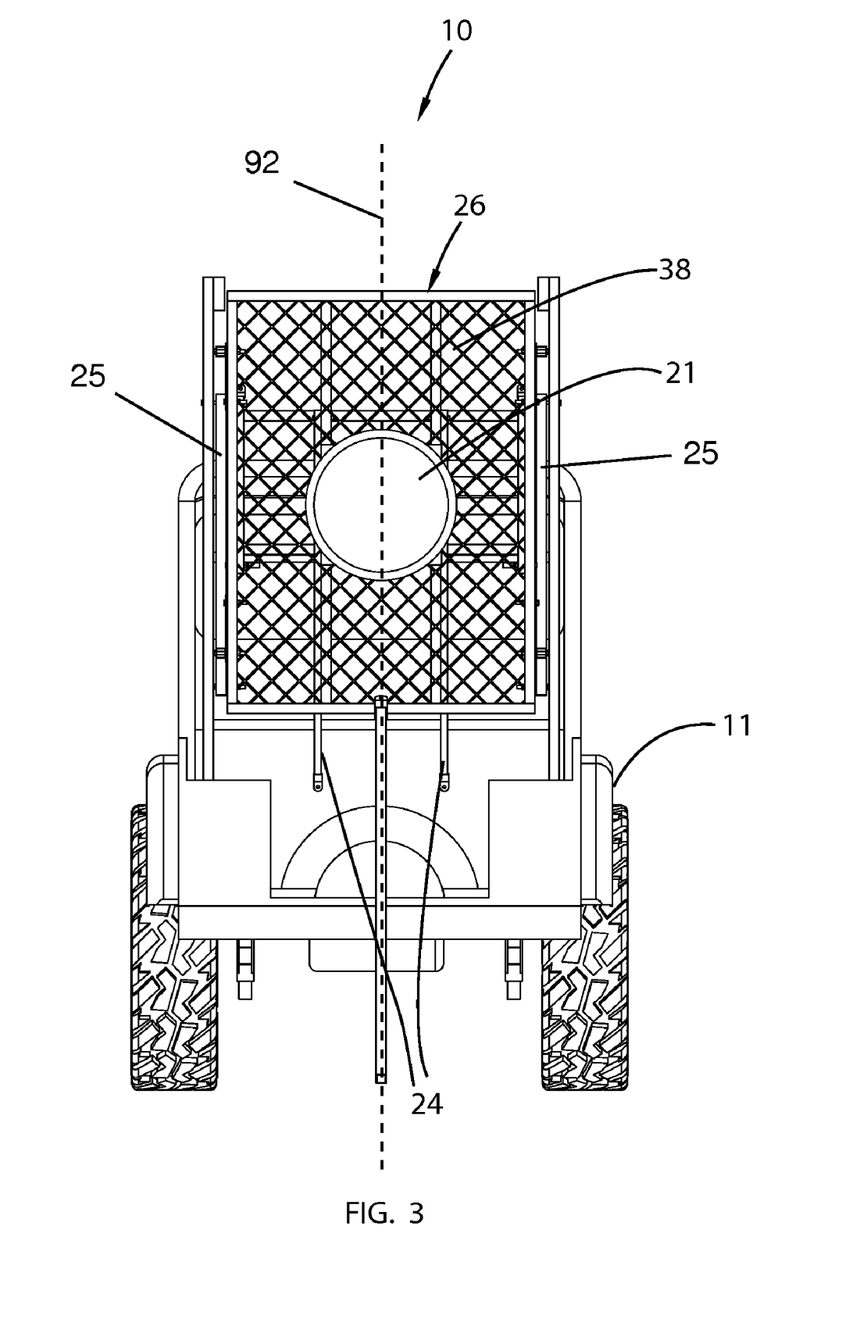
FIG. 3 is a rear elevational view of the hunting stand at the lowered stowed position.

Referring specifically to FIGS. 1 and 2, pole 39 may be used to assist in raising the observation platform 20 from the lowered stowed position to its raised erect position. Such an arrangement provides the unexpected and unpredictable advantage of synchronously rotating the support beams 32, 33 when deploying the observation platform 20 to its raised or stowed positions in an efficient manner while simultaneously articulating the first support structure 22 to its raised erect position.

The present invention may further include a method of utilizing a collapsible hunting stand 10 selectively stowed and deployed on a vehicle 11. Such a method preferably includes the chronological steps of: providing an observation platform 20 preferably having a seat 21 rotatably attached thereto; providing and pivotally connecting a first auxiliary support structure 22 to the observation platform 20; providing and pivotally connecting a second auxiliary support structure 23 to the first auxiliary support structure 22; statically affixing the second auxiliary support structure 23 to the vehicle 11; providing and pivotally mating a first pair of support leg members 24 to the observation platform 20; and providing and pivotally mating a second pair of support leg members 25 to the observation platform 20;

The method may further include the chronological steps of: removably attaching the first pair of support leg members 24 to the vehicle 11; removably attaching the second pair of support leg members 25 to the first auxiliary support structure 22; selectively pivoting the observation platform 20 about a first pivot axis 90 by articulating the observation platform 20 between an associated raised erect position and an associated lowered stowed position; and selectively pivoting the first auxiliary support structure 22 about a second pivot axis 91 by articulating the first auxiliary support structure 22 between an associated raised erect position and an associated lowered stowed position.

The combination of such claimed elements provides an unpredictable and unexpected benefit of providing users with a hunting stand 10 that is easily and safely transported and assembled on a vehicle traveling between remote locations, which solves the problem of having to repeatedly assemble and dismantle a hunting stand during hunting and transportation procedures, respectively.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A collapsible hunting stand for being selectively stowed and deployed on a vehicle, said collapsible hunting stand comprising:

an observation platform having a seat attached thereto;

a first auxiliary support structure pivotally connected to said observation platform;

a second auxiliary support structure pivotally connected to said first auxiliary support structure;

a first pair of support leg members pivotally mated to said observation platform; and a second pair of support leg members pivotally mated to said observation platform and removably attached to said first auxiliary support structure respectively;

wherein said observation platform is pivoted about a first pivot axis when said observation platform is articulated between an associated raised erect position and an associated lowered stowed position;

wherein said first auxiliary support structure is selectively pivoted about a second pivot axis when said first auxiliary support structure is articulated between said associated raised erect position and said associated lowered stowed position;

wherein said seat remains attached to said observation platform after said observation platform is articulated between said associated raised erect position and said associated lowered stowed position and after said first auxiliary support structure is articulated between said associated raised erect position and said associated lowered stowed position;

wherein said observation platform maintains a fixed structural configuration after said observation platform is articulated between said associated raised erect position and said associated lowered stowed position and after said first auxiliary support structure is articulated between said associated raised erect position and said associated lowered stowed position;

wherein said first and second auxiliary support structures are vertically aligned along a vertical axis when said observation platform is biased to said associated raised erect position such that said seat is aligned with a horizontal axis;

wherein said first and second pairs of support legs are obliquely offset relative to said vertical axis when said observation platform is biased to said associated raised erect position;

wherein said observation platform comprises:

a rectangular top frame including a plurality of rectilinear first guard rails orthogonally conjoined in an end-to-end pattern, said top frame being registered parallel to said horizontal axis when said observation platform is biased to said associated raised erect position; a plurality of rectilinear support bars statically mated to opposed corners of said top frame, said support bars being registered parallel to said vertical axis when said observation platform is biased to said associated raised erect position; a rectangular bottom frame including a plurality of rectilinear second guard rails orthogonally conjoined in an end-to-end pattern, said bottom frame being registered parallel to said horizontal axis when said observation platform is biased to said raised erect position; a bottom surface formed from a mesh screen and disposed subjacent to said top frame, said mesh screen being statically conjoined to an entire inner perimeter of said bottom frame; and a plurality of rectilinear tensioning bars statically mated to opposed corners of said bottom frame as well as bottom ends of said support bars respectively;

wherein said first auxiliary support structure further comprises:

rectilinear first and second support beams, said first and second support beams aligned parallel to said vertical axis when said observation platform is in said associated raised erect position; and a first plurality of rectilinear cross beams intercalated between said first and second support beams; wherein top ends of said first and second support beams are pivotally mated to selected corners of said opposed corners of said bottom frame;

wherein said second auxiliary support structure comprises:

rectilinear third and fourth vertical support beams; and a second plurality of rectilinear cross bars intercalated between said third and fourth support beams; wherein a lower end of said first and second support beams are pivotally mated to an upper end of said third and fourth support beams respectively; wherein a lower end of said third and fourth support beams are adapted to be statically coupled to the vehicle; wherein said first and second pairs of support leg members are adapted to be disconnected from the vehicle when said observation platform and said first auxiliary support structure are pivoted about said first and second pivot axes respectively; wherein said second auxiliary support structure remains vertically aligned with said vertical axis as said observation platform and said first auxiliary support structure are pivoted about said first and second pivot axes respectively; and wherein said first and second pair of support leg members are disposed parallel to said vertical axis when said observation platform is articulated to said associated lowered stowed position.

2. The collapsible mobile hunting stand of claim 1, wherein said first pivot axis traverses said top ends of said first and second support beams, said second pivot axis traversing said bottom ends of said first and second support beams.

3. A collapsible hunting stand for being selectively stowed and deployed on a vehicle, said collapsible hunting stand comprising:

an observation platform having a seat rotatably attached thereto;

a first auxiliary support structure pivotally connected to said observation platform;

a second auxiliary support structure pivotally connected to said first auxiliary support structure and adapted to be statically affixed to the vehicle respectively;

a first pair of support leg members pivotally mated to said observation platform and adapted to be removably attached to the vehicle respectively; and a second pair of support leg members pivotally mated to said observation platform and removably attached to said first auxiliary support structure respectively;

wherein said observation platform is selectively pivoted about a first pivot axis when said observation platform is articulated between an associated raised erect position and an associated lowered stowed position;

wherein said first auxiliary support structure is selectively pivoted about a second pivot axis when said first auxiliary support structure is articulated between said associated raised erect position and said associated lowered stowed position;

wherein said seat remains attached to said observation platform while said observation platform is articulated between said associated raised erect position and said associated lowered stowed position and while said first auxiliary support structure is articulated between said associated raised erect position and said associated lowered stowed position;

wherein said observation platform maintains a fixed structural configuration while said observation platform is articulated between said associated raised erect position and said associated lowered stowed position and while said first auxiliary support structure is articulated between said associated raised erect position and said associated lowered stowed position;

wherein said first and second auxiliary support structures are vertically aligned along a vertical axis when said observation platform is biased to said associated raised erect position such that said seat is aligned with a horizontal axis; wherein said first and second pairs of support legs are obliquely offset relative to said vertical axis when said observation platform is biased to said associated raised erect position;

wherein said observation platform comprises:

a rectangular top frame including a plurality of rectilinear first guard rails orthogonally conjoined in an end-to-end pattern, said top frame being registered parallel to said horizontal axis when said observation platform is biased to said associated raised erect position; a plurality of rectilinear support bars statically mated to opposed corners of said top frame, said support bars being registered parallel to said vertical axis when said observation platform is biased to said associated raised erect position; a rectangular bottom frame including a plurality of rectilinear second guard rails orthogonally conjoined in an end-to-end pattern, said bottom frame being registered parallel to said horizontal axis when said observation platform is biased to said raised erect position; a bottom surface formed from a mesh screen and disposed subjacent to said top frame, said mesh screen being statically conjoined to an entire inner perimeter of said bottom frame; and a plurality of rectilinear tensioning bars statically mated to opposed corners of said bottom frame as well as bottom ends of said support bars respectively;

wherein said first auxiliary support structure further comprises:

rectilinear first and second support beams, said first a second support beams aligned parallel to said vertical axis when said observation platform is in said associated raised erect position; and rectilinear first plurality of rectilinear cross beams intercalated between said first and second support beams; wherein top ends of said first and second support beams are pivotally mated to selected corners of said opposed corners of said bottom frame;

wherein said first and second pairs of support leg members are adapted to be disconnected from the vehicle when said observation platform and said first auxiliary support structure are pivoted about said first and second pivot axes respectively;

wherein said second auxiliary support structure remains vertically aligned with said vertical axis as said observation platform and said first auxiliary support structure are pivoted about said first and second pivot axes respectively; and wherein said first and second pair of support leg members are disposed parallel to said vertical axis when said observation platform is articulated to said associated lowered stowed position.

4. The collapsible mobile hunting stand of claim 3, wherein said second auxiliary support structure comprises:

rectilinear third and fourth vertical support beams; and a second plurality of rectilinear cross bars intercalated between said third and fourth support beams;

wherein a lower end of said first and second support beams are pivotally mated to an upper end of said third and fourth support beams respectively;

wherein a lower end of said third and fourth support beams are adapted to be statically coupled to the vehicle.

5. The collapsible mobile hunting stand of claim 3, wherein said first pivot axis traverses said top ends of said first and second support beams, said second pivot axis traversing said bottom ends of said first and second support beams.

* * * * *